Output omitted — patent text body 3,183,039
VEHICLE WHEEL AND TIRE TRIM
Charles B. Aske, Jr., Birmingham, Mich., assignor, by mesne assignments, to Gar Wood Industries, Inc., a corporation of Michigan
Filed Mar. 5, 1964, Ser. No. 349,687
3 Claims. (Cl. 301—37)

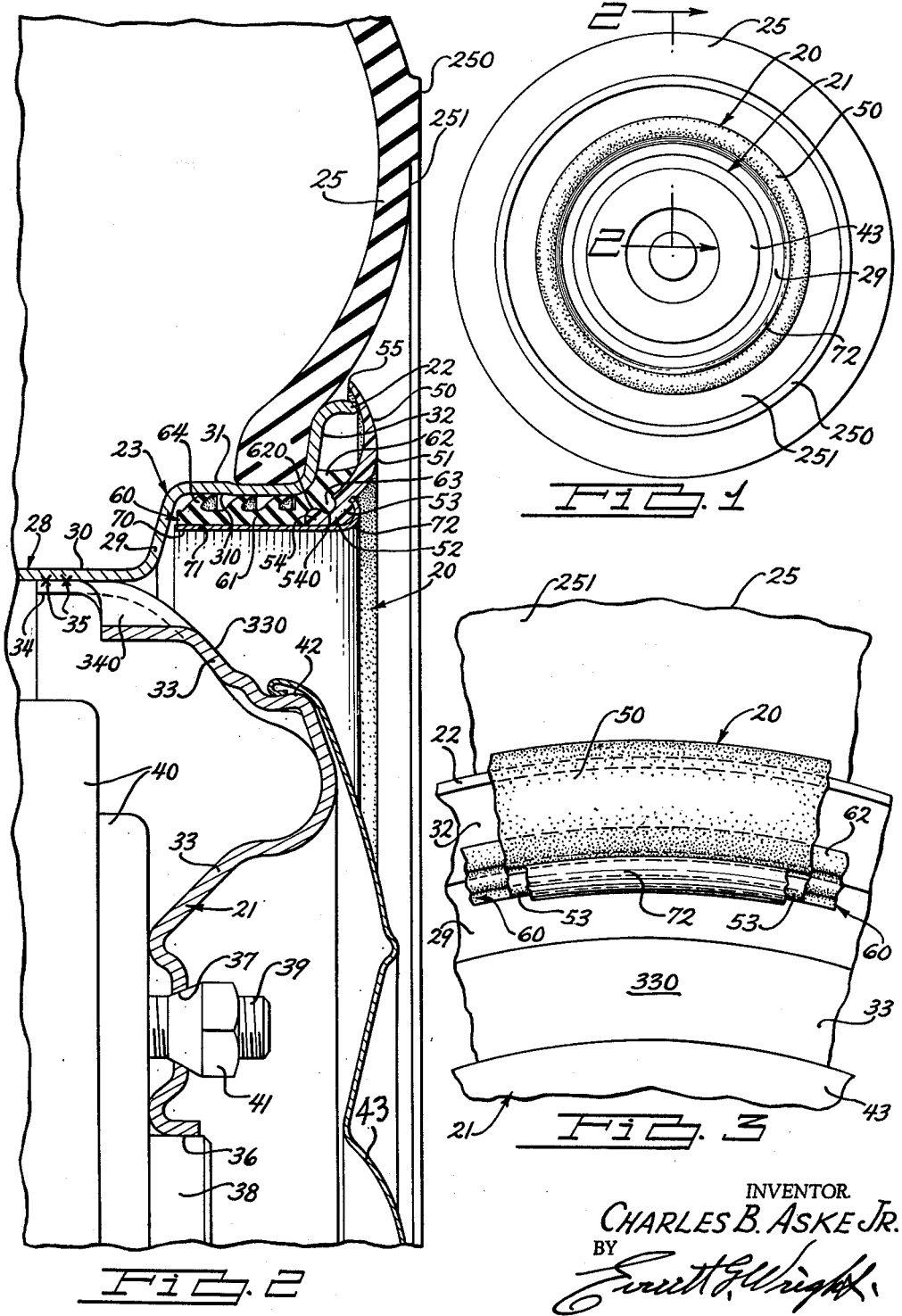

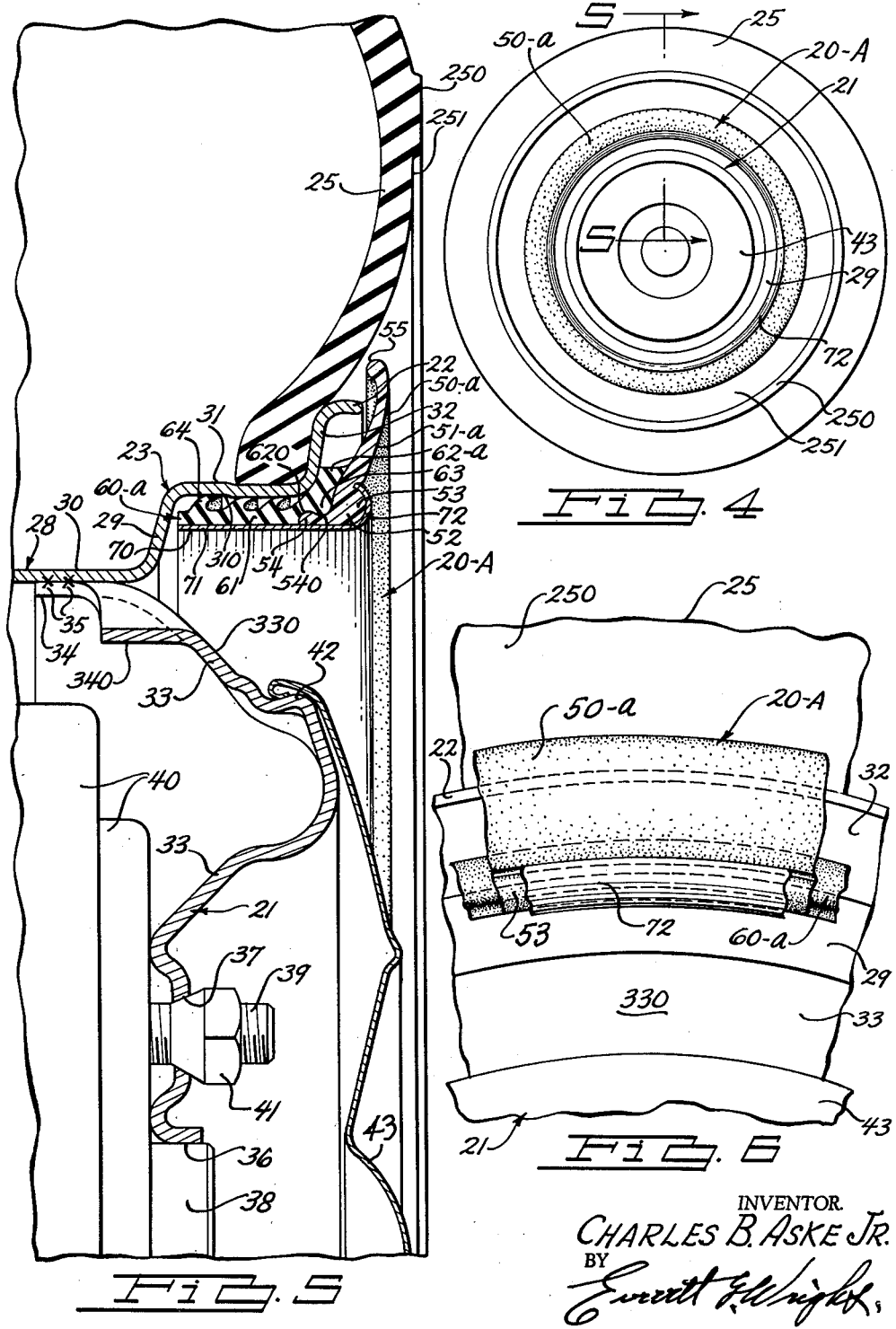

This invention relates to improved vehicle wheel and tire trim construction employing a rim trim ring and separate anchorage and tire trim elements assembled in interlocked relationship with respect to each other and onto the said rim trim ring, the said assembly being held onto the tire bead seat flange of the vehicle wheel by said anchorage element.

The primary object of the invention is to provide vehicle wheel and tire trim construction comprising an annular rim trim element having a radially disposed circumferential outer flange, an annular tire trim element assembled at its inner circumference around the said annular rim trim element extending radially outwardly therefrom adjacent the said outer flange thereof, and a circumferentially toothed axially disposed anchorage element assembled around said annular rim trim element, the inner annular portion of said tire trim element and the axially disposed portion of said anchorage element having annular bulbous interlocking formations whereby the several elements become secured in interlocked relationship with respect to each other upon mounting the said vehicle wheel and tire trim onto a vehicle wheel with the axially inner portion of the said wheel trim and anchorage elements disposed in axial telescoping relationship within the tire bead seat of the vehicle wheel.

A further object of the invention is to provide a vehicle wheel and tire trim of the aforesaid type wherein the adjacent formations at the juncture between the axial outer annular portion of the anchorage element and the axial inner portion of the tire trim element are complementary, and the outer annular portion of the said anchorage element is formed to maintain the desired attitude of the tire trim element and its relationship to or spacing from the tire bead seat flange and lip of the rim of the vehicle wheel upon which the vehicle wheel and tire trim is mounted.

Other objects of the invention will become apparent by reference to the following detailed description taken in connection with the accompanying drawings in which:

FIG. 1 is an axial elevational view of a vehicle wheel and tire having mounted thereon vehicle wheel and tire trim according to the invention.

FIG. 2 is an enlarged fragmentary sectional view taken on the line 2—2 of FIG. 1.

FIG. 3 is an enlarged fragmentary elevational view of the wheel and tire trim of FIGS. 1 and 2.

FIG. 4 is an axial elevational view similar to FIG. 1 showing an alternate vehicle wheel and tire trim of the invention wherein the tire trim portion is spaced from the lip of the vehicle wheel rim and the tire mounted thereon.

FIG. 5 is an enlarged fragmentary sectional view taken on the line 5—5 of FIG. 4.

FIG. 6 is an enlarged fragmentary elevational view of the wheel and tire trim of FIGS. 4 and 5.

Referring now to the drawings wherein like reference characters refer to like and corresponding parts throughout the several views, the particular embodiment of the invention disclosed for illustrative purposes in FIGS. 1–3 inclusive consists of a vehicle wheel and tire trim assembly 30 readily mounted and maintained in its proper position on a vehicle wheel 21 having a tubeless tire 25 thereon.

The said vehicle wheel 21 has a drop center rim 23 composed of a central channel or drop center 28 having side walls 29 and a base 30. An annular tire bead seat 31 extends laterally outwardly from each side of the side walls 29 of the drop center 28, each said tire bead seat 3 terminating in a tire bead seat flange 32 extending radially therefrom which is axially outwardly curved at it upper portion to form an axially disposed outer lip 22 The said tire bead seat flange 32 is ofttimes referred t as the wheel flange and the said lip 22 is ofttimes referre to as the lip of the wheel rim. Within the drop cente rim 23 is a wheel spider 33 having an axially dispose flange 34 which is secured to the drop center channe 28 of the drop center rim 23 by such means as weldin at 35. The said wheel spider 33 is provided with a cer tral hub aperture 36 with securing stud holes 37 space therearound to accommodate respectively the wheel hu 38 and wheel securing studs 39 extending from the brak drum 40 to which the wheel 21 is secured by means c the usual wheel securing nuts 41.

The flange 34 of the spider 33 is generally scallope out and formed at 340 at intervals around the peripher thereof to provide brake drum ventilation and adde structural strength to the vehicle wheel 21. The spide 33 is generally formed with an annular axially outwardl extending collar 330 which is preferably provided with plurality of hub cap retainer nubs 42 over which a cor ventional hub cap 43 is sprung for securement onto th vehicle wheel 21. The said spider collar 330 has a annular exposed painted surface extending from the oute periphery of the hub cap 43 to the drop center whe rim 23, which also has its exposed surfaces painted. Th particular tire 25 illustrated in the drawings is a moder tubeless tire having a scuff bead 250 extending from i side wall 251. The said tubeless tire 25, when used o the vehicle wheel 21, requires a valve stem (not shown mounted in sealed relationship through a suitable valv stem aperture usually provided in the outer wall 29 of th drop center rim channel 28 of the rim 23 of the sai wheel 21.

The particular embodiment of the wheel and tire trii assembly 20 disclosed in FIGS. 1–3 inclusive consists ( three elements; namely, a generally radially disposed ai nular resilient tire trim element 50, a generally axially di posed annular resilient toothed anchorage element 60, an a generally axially disposed annular metal wheel trim el ment 70, all of which are assembled into an interlocke wheel and tire trim assembly 20 prior to mounting th same on a vehicle wheel 21 with the toothed portion ( the anchorge element 60 telescoped within the inner ar nulus of the tire bead seat annulus 310 as best shov in FIG. 2.

The tire trim element 50 is preferably formed of but rubber or vinyl plastic, however, it also may be molde of a suitable rubber or other resilient material. The sa tire trim element 50 may be of any suitable color to pr vide a desired ring type accent or white side wall ti effect. The tire trim element 50 includes a preferab arcuate annular side wall portion 51 extending radial outwardly from an axially disposed preferably doub bulbous base portion 52 which has an axially outer a nular bulbous anchorage rib 53, and an axially inn annular bulbous anchorage rib 54 with an annular r entrant anchorage groove 540 formed in the said ba: portion adjacent said inner anchorage rib 54.

The anchorage element 60 is preferably formed of relatively firm resilient rubber or rubber compound, ar consists of an annular axially inwardly disposed anchora; flange portion 61 extending axially inwardly from a cor bined annular spacer and anchorage flange portion ( which has an annular bulbous anchorage rib 63 with ; annular anchorage groove 620 adjacent thereto. Tl said anchorage flange portion 61 of the anchorage element 60 is provided with a plurality of circumferential axially spaced resilient anchorage teeth 64 disposed radially outwardly therefrom preferably formed generally triangular in cross section to readily flex axially outwardly when a wheel and tire trim assembly 20 consisting of the tire trim element 50, anchorage element 60 and wheel trim element 70 is telescopingly mounted on the rim 23 of the vehicle wheel 21 with the said toothed anchorage flange portion 61 of the anchorage element 60 within the radially inner annulus of the tire bead seat 31 as best shown in FIG. 2.

The axially inner annular bulbous anchorage rib 54 and the reentrant annular anchorage groove 540 of the double bulbous base portion 52 of the tire trim element 50 are located and sized to nest into and receive respectively the reentrant annular anchorage groove 620 and the annular anchorage rib 63 of the annular spacer and anchorage flange portion 62 of the anchorage element 60. Stated another way, the annular anchorage rib 63 of the annular spacer and anchorage flange portion 62 of the anchorage element 60 and the anchorage groove 620 thereof are located and sized to nest into and receive respectively the annular anchorage groove 540 and annular anchorage rib 54 of the double bulbous base portion 52 of the tire trim element 50. The annular spacer and anchorage flange portion 62 of the anchorage element 60 is formed to abut the juncture between the annular tire bead seat 31 and the tire bead seat flange 32 of the wheel rim 23 and to space the annular side wall portion 51 of the tire trim element 50 from the tire bead seat flange 32 of the wheel rim 23 as shown in FIG. 2 when the tire trim-wheel trim assembly 20 is mounted on the vehicle wheel 21 as shown in FIG. 2.

The rim trim element 70 is annularly formed preferably of a plain or ornamental strip steel, and consists of an axially disposed annular sleeve portion 71 and a radially disposed bull nose or bead portion 72.

The tire trim element 50 and anchorage element 60 are first assembled in annular interlocked relationship, and the said sub-assembly is then telescoped over the annular sleeve portion 71 of the rim trim element 70 with the axially outer bulbous anchorage rib 53 of the double bulbous base 52 of the tire trim element 50 disposed within the said annular bull nose or bead portion 72 of the rim trim element 70. The annular rim trim element 70 sizes the sub-assembly of the tire trim element 50 and the anchorage element 60 so that the entire vehicle wheel and tire trim assembly 20 may be firmly and accurately telescoped onto a vehicle wheel 21 within the inner annulus of the tire bead seat flange 32 as best shown in FIG. 2 where it stays in place and will not become loosened by road shocks or quick starting or stopping of the motor vehicle. To remove the said vehicle wheel and tire trim assembly 20 from the vehicle wheel, it is necessary to pry or manually pull the said tire trim assembly axially outwardly therefrom. In so doing, the outer periphery of the continuous anchorage teeth 64 initially flex to a position reverse to that shown in FIG. 2. This initial flexing of the anchorage teeth 64 requires a considerable axial pull on the said wheel and tire trim assembly 20 to start its removal from the said vehicle wheel 21.

The interlocking relationship of the annular bulbous anchorage rib 54 of the tire trim element 50 into the annular anchorage groove 620 of the anchorage element 60, and, the interlocking relationship of the annular bulbous anchorage rib 63 of the anchorage element 60 into the annular anchorage groove 540 of the tire trim element 50, both, in combination, provide a positive anchorage of the tire trim element 50 within and axially rearwardly of the bull nose or bead portion 72 of the rim trim element 70 upon the seating of the axially inner portion of the said anchorage rib 62 at the juncture 3132 between the tire bead seat 31 and the tire bead seat flange 32 when the wheel and tire trim assembly 20 is mounted on a vehicle wheel as best shown in FIG. 2.

It will be noted that, in the embodiment of the invention disclosed in FIGS. 1, 2 and 3, the arcuate tire trim element 50 is relatively narrow and arcuate in shape so as to come to rest against the outer peripheral edge of the lip 22 of the wheel rim 23, and, preferably, as shown in FIG. 2, the outer annular periphery 55 of the tire trim element 50 is preferably spaced from the side wall 251 of the tire 25 just above the said lip 22 of the wheel rim 23. This is preferable when the tire trim element 50 is formed of a natural rubber compound that would discolor from the bleeding of carbon black from the side wall 251 of the tire 25.

Referring now to the embodiment of the invention disclosed in FIGS. 3, 4 and 5, it will be observed that the vehicle wheel and tire trim 20–A of the invention has been modified so that the tire trim element 50–a may be wider than the tire trim element 50 disclosed in FIGS. 1, 2 and 3, and is held in spaced relationship with respect to the side wall 251 of the tire 25. Also, the tire trim element 50–a does not contact the outer peripheral edge 22 of the wheel rim 23. The foregoing is accomplished by suitably forming and proportioning the annular spacer and anchorage flange portion 62–a of the anchorage element 60–a as shown in FIG. 4 to abut the juncture between the annular tire bead seat 31 and the tire bead seat flange 32 of the wheel rim 23 and to space the wall 51–a of the tire trim element 50–a from both the outer peripheral lip 22 of the rim 23 and the side wall 251 of the tire 25.

Thusly, both a narrow tire trim element 50 and relatively wider tire trim element 50–a may employ in the instant improvement over the prior art, with the outer periphery of the tire trim element 50 or 50–a held in spaced relationship from the side wall 251 of tire 25, and all with a positive anchorage of the tire trim elements 50 or 50–a on the vehicle wheel 21 and into the tire trim assembly 20 or 20–a when such an assembly is mounted on a vehicle wheel 21.

Although but a single embodiment of the invention and one modification thereof has been disclosed and described herein, it is obvious that many changes may be made in the size, shape, arrangement and detail of the various elements of the invention, all without departing from the spirit and scope thereof as defined by the appended claims.

I claim:

1. A wheel and tire assembly for vehicle wheels including a rim having a tire bead seat forming an axially outwardly disposed tire bead seat annulus, a tire bead seat flange terminating into an annular axially disposed wheel rim lip, and a tire mounted on said rim, said wheel and tire trim assembly covering said tire bead seat and the exposed portion of said rim outwardly therefrom and trimming said tire mounted on said rim comprising
    an annular wheel trim element including an axially disposed annular sleeve portion somewhat smaller in diameter than the said tire bead seat annulus of the said vehicle wheel, and an axially outer radially disposed bull nose portion,
    an annular tire trim element including an arcuate side wall portion and an annular double bulbous generally axially disposed base portion including an outer axially disposed annular bulbous anchorage rib and an inner radially disposed annular bulbous anchorage rib with an annular reentrant anchorage groove formed in said base portion adjacent said inner anchorage rib,
    an annular anchorage element including an annular axially inwardly disposed base portion, a plurality of circumferential generally triangular axially spaced radially extending flexible anchorage teeth on said base portion, and an annular combined spacer and anchorage flange portion extending axially and radially outwardly from said base portion, said combined spacer and anchorage flange portion including an annular bulbous anchorage rib and an adjacent annular anchorage groove located to nest into and receive respectively the said annular anchorage groove and the inner radially disposed bulbous anchorage rib of the double bulbous base portion of said wheel trim element, said tire trim element and said anchorage element being assembled in interlocked juxtaposition on said wheel trim element in that order with said tire trim element disposed adjacent said bull nose portion of said wheel trim element and with the bull nose portion of said wheel trim element in contact with the outer axially disposed annular bulbous anchorage rib of the annular double bulbous base of said tire trim element, the outside diameter of said anchorage teeth of the annular axially disposed base portion of the annular anchorage element being somewhat greater than the diameter of the tire bead seat annulus of said vehicle wheel whereupon the telescoping of the axially disposed portion of said wheel and tire trim assembly to refusal within the tire bead seat annulus of said vehicle wheel with the annular spacer and anchorage flange portion of the said anchorage element in abutment against the juncture of the tire bead seat and tire bead seat flange of the vehicle wheel firmly but removably anchors the said vehicle wheel and tire trim assembly as a unitary whole in the desired position on said vehicle wheel.

2. A wheel and tire trim assembly as claimed in claim 1 wherein the annular arcuate side wall portion of said tire trim element is formed to overlie and contact the lip of said wheel rim but with the outer periphery thereof spaced from the outer wall of said tire.

3. A wheel and tire trim assembly as claimed in claim 1 wherein the combined annular outer spacer and anchorage flange portion of said anchorage element formed to space said side wall portion of said tire trim element from the lip of said wheel rim and the outer wall of said tire.

References Cited by the Examiner
UNITED STATES PATENTS

| | | | |
|---|---|---|---|
| 2,963,325 | 12/60 | Aske | 301—3 |
| 2,970,010 | 1/61 | Lyon | 301—3 |
| 2,996,334 | 8/61 | Aske | 301—3 |
| 3,078,125 | 2/63 | Aske | 301—3 |

ARTHUR L. LA POINT, *Primary Examiner.*